May 5, 1970  A. BRAATEN  3,509,708
CABLE WINDING MACHINE WITH INDIVIDUAL CRADLE DRIVE
Filed Dec. 11, 1967
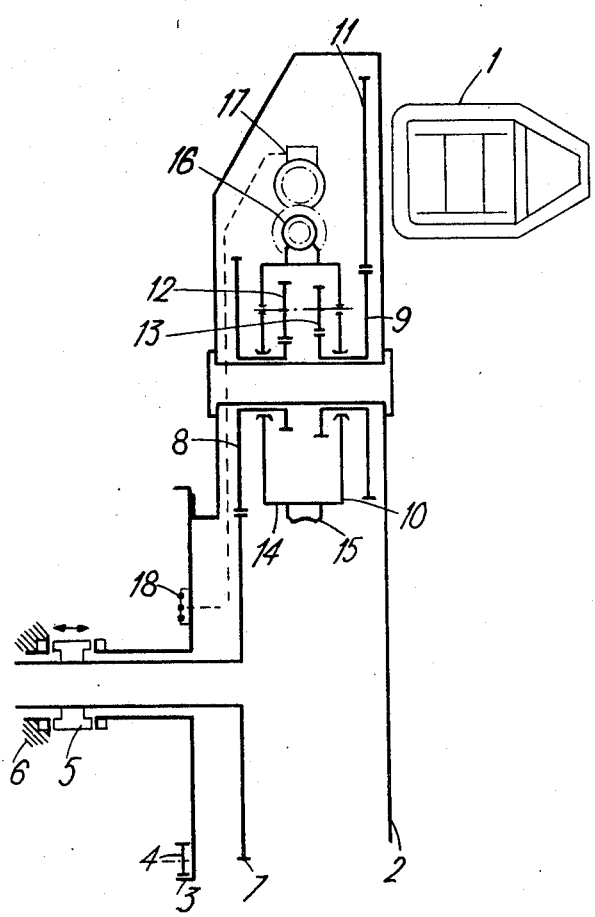
Inventor
AMUND BRAATEN
By Edward Goldberg
Attorney

United States Patent Office 3,509,708
Patented May 5, 1970

3,509,708
CABLE WINDING MACHINE WITH INDIVIDUAL CRADLE DRIVE
Amund Braaten, Oslo, Norway, assignor to International Standard Electric Corporation, New York, N.Y., a corporation of Delaware
Filed Dec. 11, 1967, Ser. No. 689,690
Int. Cl. D01h 7/90, 13/22; D07b 3/04
U.S. Cl. 57—58.32
3 Claims

ABSTRACT OF THE DISCLOSURE

Cradles for pay-off reels of a machine for winding sector core conductors into a cable are provided with individual gearing and angular displacement compensating motors mounted in a rotatable carriage. Only one set of slip rings from the supply line is required.

BACKGROUND OF THE INVENTION

Field of the invention

The present invention relates to a machine for laying up pretwisted sector core conductors into a cable and comprises a rotatable carriage with cradles for pay-off reels, mechanical gearing by means of which each cradle may be rotated about its own axis in order to provide the respective sector core with a desired twist and individual electrical motors arranged to rotate the respective cradles in order to compensate for positive and negative angular displacements of the respective sector cores, the changes in angular displacement being detected by individual sensing units controlling the respective motors.

Description of the prior art

Angular displacement compensating motors for winding sector core conductors are normally mounted to follow the rotation of the respective cradles. The driving power for each of the motors must therefore pass two sets of slip rings, a first set between the main supply line and the carriage and a second set between the carriage and the motors.

SUMMARY OF THE INVENTION

The object of the present invention is to provide a cable winding machine in which the transfer of driving power to the individual motors is simplified.

The main feature of the present invention is that the motors are mounted on the carriage, the compensating angular displacement being transmitted to the respective cradles by means of individual mechanical differentials included in the mechanical gearing.

By using a machine of this type only one set of slip rings is required, namely the set between main supply line and the carriage. Maintenance of the machine is thereby reduced considerably. The above mentioned and other features of the invention will become apparent from the following description taken in conjunction with the drawing.

BRIEF DESCRIPTION OF THE DRAWING

The figure shows a portion of a cable winding machine having individual gearing and compensating motors mounted on the carriage for each reel cradle.

DESCRIPTION OF THE PREFERRED EMBODIMENT

As shown in the figure, a portion of a cable winding machine includes one cradle 1 rotatably mounted in a carriage 2. The carriage is arranged to be rotated about the machine axis by gearing 3 connected to a main driving gear 4. When a sliding coupling 5 is switched into connection with a fixed machine frame 6, a gear 7 will not rotate. When the carriage 2 is rotated by gears 3, 4, a gear 8 will roll on the stationary gear 7, this rotation being transferred to a gear 9 by means of a mechanical differential 10. The cradle 1 will now rotate together with a gear 11 in opposite direction to that of the carriage 2, the gearing being such as to provide each sector core conductor from each cradle with a desired twist. The mechanical differential 10 comprises one or more sets of gear pairs 12, 13 which, as shown, are transferring rotation from gear 8 to gear 9.

The housing 14 is provided with a worm-geared surface 15 which is in engagement with a worm gear 16, the rotation of which is controlled by an angular compensation motor 17. The motor 17 is mounted on the carriage 2 and receives its electrical driving power from slip rings 18 on the carriage 2. The rotation of the motor is controlled by a known sensing unit, not shown, detecting changing positive and negative angular displacements of the sector cores paid off from a reel mounted in the cradle 1 to twist the conductors in desired angular relationship. When housing 14 is rotated in one direction the gear 9 is rotated in the opposite direction and the cradle is rotated in the same direction as housing 14 to compensate for variations in the angular relationship of the sector cores. As soon as such displacement is compensated for, a sensing unit controls the motor to stop its rotation. Each of a plurality of cradles mounted on the carriage are driven in a like manner.

What is claimed is:
1. A cable winding machine for laying up sector core conductors into a cable comprising a rotatable carriage, a main motor driving said carriage, cradles including conductor payoff reels mounted on said carriage, individual mechanical gearing means on said carriage coupling said main motor respectively to each cradle to rotate said cradle about its own axis to provide the respective sector core conductor with a predetermined twist, sensors for sensing variations in angular displacement, and individual electrical motors mounted on said carriage and controlled by said sensors to rotate the respective cradles to compensate for variations in angular displacement of the respective sector core conductor and to stop rotating said cradles upon compensation of said displacement.

2. The machine of claim 1 wherein said gearing includes mechanical differentials transmitting angular displacement variations from said motors to said cradles.

3. The machine of claim 1 including an electrical supply line, wherein one set of slip rings connects said supply line to each motor.

References Cited

UNITED STATES PATENTS

| | | | |
|---|---|---|---|
| 276,318 | 4/1883 | Wiswell | 57—14 XR |
| 2,079,873 | 5/1937 | Reed | 57—166 XR |
| 2,105,338 | 1/1938 | Sunderland | 57—14 XR |
| 2,802,328 | 8/1957 | Ritchie | 57—13 |
| 2,873,569 | 2/1959 | Schinkie et al. | 57—58.32 |
| 3,128,799 | 4/1964 | Kerr. | |

DONALD E. WATKINS, Primary Examiner

U.S. Cl. X.R.
57—100